United States Patent
Trede (10) Patent No.: US 9,347,543 B2
(45) Date of Patent: May 24, 2016

(54) GEARBOX SUPPORTING MEANS OF A WIND TURBINE, WIND TURBINE, AND METHOD FOR MAINTAINING A GEARBOX SUPPORTING MEANS

(71) Applicant: Senvion SE, Hamburg (DE)

(72) Inventor: Alf Trede, Immenstedt (DE)

(73) Assignee: Senvion SE, Hamburg (DE)

( * ) Notice: Subject to any disclaimer, the term of this patent is extended or adjusted under 35 U.S.C. 154(b) by 0 days.

(21) Appl. No.: 14/498,098

(22) Filed: Sep. 26, 2014

(65) Prior Publication Data

US 2015/0007692 A1  Jan. 8, 2015

Related U.S. Application Data

(63) Continuation of application No. PCT/EP2013/000584, filed on Feb. 28, 2013.

(30) Foreign Application Priority Data

Mar. 29, 2012 (DE) .......................... 10 2012 205 090

(51) Int. Cl.
  *F16H 57/02* (2012.01)
  *F16H 57/025* (2012.01)
  *F03D 11/00* (2006.01)
  *F16H 57/021* (2012.01)

(52) U.S. Cl.
  CPC .......... *F16H 57/025* (2013.01); *F03D 11/0008* (2013.01); *F16H 57/021* (2013.01); *F05B 2240/52* (2013.01); *F05B 2280/4003* (2013.01); *Y02E 10/722* (2013.01); *Y10T 74/2186* (2015.01)

(58) Field of Classification Search
  CPC . F16H 57/025; F16H 57/021; F03D 11/0008; Y10T 74/2186; Y02E 10/722; F05B 2280/4003; F05B 2240/52
  See application file for complete search history.

(56) References Cited

U.S. PATENT DOCUMENTS 7,819,624 B2   10/2010  Bonnet
8,172,535 B2*  5/2012  Nitzpon .............. F03D 11/0008
                                                416/170 R (Continued)

FOREIGN PATENT DOCUMENTS

DE        8104817         8/1982
DE       10212075        10/2003

(Continued)

OTHER PUBLICATIONS

Machine translation of WO 2008/028616 A2 obtained on Sep. 21, 2015.*

(Continued)

*Primary Examiner* — Adam D Rogers
(74) *Attorney, Agent, or Firm* — Rankin, Hill & Clark LLP (57) ABSTRACT

A gearbox supporting device of a wind turbine that has a rotor, a substantially horizontally oriented rotor shaft, a gearbox, and a main frame. The gearbox supporting device includes at least one rolling bearing arranged between a rotor hub and the gearbox and at least two supports on the gearbox. The supports each have at least one central supporting body, at least one frame and a plurality of flat elastomer bodies that are clamped between the frame and the central supporting body. The central supporting body is supported only on one side.

19 Claims, 11 Drawing Sheets

(56) References Cited

U.S. PATENT DOCUMENTS

| | | | | |
|---|---|---|---|---|
| 9,011,010 B2 * | 4/2015 | Mueller | ............... | F03D 7/0224 384/221 |
| 2009/0224513 A1 | 9/2009 | Noble et al. | | |
| 2014/0226926 A1 * | 8/2014 | Caruso | ............... | F03D 1/0658 384/125 |
| 2015/0007693 A1 * | 1/2015 | Trede | ............... | F03D 11/0008 74/606 R |

FOREIGN PATENT DOCUMENTS

| | | |
|---|---|---|
| DE | 29924608 | 5/2004 |
| DE | 102006042067 | 3/2008 |
| EP | 1046832 | 10/2000 |
| EP | 1197677 | 4/2002 |
| EP | 1867871 | 12/2007 |
| FR | 2382623 | 9/1978 |
| WO | 2008/028616 | 3/2008 |
| WO | WO 2012076892 A1 * 6/2012 ......... F03D 11/0008 |  |

OTHER PUBLICATIONS

International Search Report filed in PCT/EP2013/000584 mailed Jun. 8, 2014.

* cited by examiner

GEARBOX SUPPORTING MEANS OF A WIND TURBINE, WIND TURBINE, AND METHOD FOR MAINTAINING A GEARBOX SUPPORTING MEANS

BACKGROUND OF THE INVENTION

1. Field of the Invention

The invention relates to a gearbox supporting means of a wind turbine that has a rotor, a substantially horizontally oriented rotor shaft, a gearbox and a main frame, comprising at least one rolling bearing arranged between a rotor hub and the gearbox and at least two supports on the gearbox. The supports each have at least one central supporting body, at least one frame and a plurality of flat elastomer bodies that are or can be clamped between the frame and the supporting body. The invention further relates to a wind turbine and a method for maintaining a gearbox supporting means for a wind turbine.

2. Description of Related Art

Many modern wind turbines with substantially horizontally oriented rotor shaft axes have a gearbox in a nacelle or respectively a power house on the top of the tower, which connects the rotor with a generator. A main frame is housed in the nacelle, on which the generator and the gearbox are mounted. Since the main frame must also carry the rotor, a three-point support or a four-point support is normally used.

The three-point support which is named, as an example, comprises a rolling bearing, through which the rotor shaft is guided and which supports the rotor shaft. Two additional bearing points are arranged laterally on the gearbox and fasten the gearbox on the main frame. These lateral bearings also absorb the gearbox torque and are called supports or respectively gearbox supports.

In most existing wind turbines with gearboxes, the rolling bearing on the rotor shaft is designed as a fixed bearing, which means that this rolling bearing absorbs rotor thrust that is transferred to the rotor by the wind and transfers it to the main frame. The transmission is thereby not loaded with the corresponding rotor thrust and is thus preserved. In this case, the rotor shaft and the rolling bearing are designed in a very stable manner. The supports located laterally on the gearbox are then designed as floating bearings so that they are designed as being soft in the axial direction, i.e. parallel to the rotor shaft axis.

Another function of the bearings, in particular the supports, is the decoupling of structure-borne sound of the gearbox from the main frame. Normally, in known gearbox supports and in order to facilitate structure-borne sound decoupling, each bolt head is encased in a cylindrical rubber layer, also called a "bushing", which buffers both vertical as well as horizontal loads. Such bearings are soft in the axial direction, i.e. parallel to the rotor shaft axis. The geometry of the bolt is specified by the rubber bushing. An adjustment of the stiffness for the specified geometry is possible through the selection of the elastomer materials. The elastomer bushings also provide structure-borne sound decoupling of the gearbox and are frequently designed as cylinder half-shells. The attachment parts of these elastomer bodies can be produced with traditional machining processes, for example drilling and turning.

In the design of the bearings, the transfer of high loads, amounting namely to a couple of hundred tons, an effective sound decoupling, ease of replacement of the elastomer elements that have aged under stress as well as an economical production of the structure-borne sound decoupling as well as of the connection construction are to be taken into consideration.

A suspension system is known from U.S. Pat. No. 7,819,624 B2, in which several planar elastomer bodies are used on different sides, which are rigid vis-à-vis a compression, instead of a cylindrical elastomer body. They are arranged around a central bearing and are clamped in an outer frame.

The use of elastic flat bodies as supports of a gearbox of a wind turbine is also known from EP 1 197 677 A2, in which the gearbox comprises laterally two bearing bodies having a rhomboid cross-section, on each of which a flat body is arranged obliquely to each other on the top and on the bottom. The four flat bodies left and right of the gearbox together have a rhomboid shape.

The technical teaching in WO 2008/028616 A2 goes a different route, in which a support of a wind turbine uses two conical elastomer bodies with a vertical symmetry axis, with which a permanent support of the gearbox is also realized.

EP 1 867 871 A2 discloses a torque support that can be knocked off, which discloses a fixed bearing with cone elements and a flying arrangement.

BRIEF SUMMARY OF THE INVENTION

Based on this state of the art, the object of the present invention is to provide a gearbox supporting means, a wind turbine and a method for maintaining a gearbox supporting means of a wind turbine, which securely absorbs loads occurring during the operation of the wind turbine, enables an effective sound decoupling and enables easy replacement of elastomer bodies and an economical production.

This object is solved by a gearbox supporting means of a wind turbine that has a rotor, a substantially horizontally oriented rotor shaft, a gearbox and a main frame, comprising at least one rolling-element bearing arranged between a rotor hub and the gearbox and at least two supports on the gearbox, wherein the supports each have at least one central supporting body, at least one frame and a plurality of flat elastomer bodies that are or can be clamped between the frame and the central supporting body, wherein the gearbox supporting means is further developed in that the central supporting body is only supported on one side.

Within the framework of the present invention, a flat elastomer body is understood as planar, level bodies made of an elastomer, in differentiation to elastomer bodies with bent or curved surfaces, such as for example conical or cylindrical bodies, i.e. non-flat bodies.

The gearbox supporting means according to the invention has at least two supports on the gearbox, which are designed with a single-sided bearing which is also referred to as a "flying bearing". The advantage of the flying bearing of the bolt is that the flat elastomer bodies can be maintained and replaced more easily. By the combination according to the invention of the use of flat elastomer bodies on the one hand and of central support bodies clamped on one side on the other hand the main disadvantage of the flying bearing, namely the weak point of the clamping cross-section can be compensated. This weak point cannot be further optimized with conventional cylindrical bolts, since the round geometry of the cross-section is predetermined.

Through the above mentioned combination according to the invention of flat elastomer bodies which are mounted on one side a synergetic effect is caused so that the cross-section of the central supporting body can be adjusted optimally to the occurring loads, especially to the relationship of the vertical load to the horizontal load. Moreover, the accessibility is improved since the mounting of the flying bearing can be attached to a side of the support that can be easily reached by operating personnel, while space to access the bearing is often very limited on the opposite side.

Preferably at least two of the supports are designed as fixed bearings for absorbing at least 50% of the rotor thrust acting in the axial direction of the rotor shaft during the operation of the wind turbine. In particular, it is provided that the supports designed as fixed bearings absorb more than 80%, in particular more than 95% of the rotor thrust. Thus, the corresponding support is designed as a fixed bearing. It is thereby possible to design the rolling bearing on the rotor shaft as a floating bearing, but the rolling bearing can also be partially designed as a fixed bearing and can also absorb a portion of the rotor thrust. The less rotor thrust load the rolling bearing needs to absorb, the smaller and more compact the bearing can be designed. In the case of a smaller bearing, the diameter of the rotor shaft can also be designed smaller.

As an alternative or in addition, advantageously at least two of the supports are designed as floating bearings, wherein the flat elastomer bodies with their surface normal vectors are oriented with their surface normal vectors substantially perpendicular to the rotor axis, so that rotor thrust causes substantially a shearing stress in the flat elastomer bodies.

The central supporting body and the frame require a changed geometry compared to the bearings of the state of the art with cylindrical or respectively hollow-cylindrical elastomers since level surfaces must now be produced for receiving the flat elastomer bodies, which are complementary to each other. These inclined planes should be produced with a high precision with respect to each other. In contrast to the flat elastomer bodies, the frame and the central supporting body are however retained during the service life of the wind turbine so that they only need to be produced once, while the flat elastomer bodies need to be replaced during the course of the service life of a wind turbine. The increased effort to produce the level polygonal structure of the supporting body and of the frame is thus counterbalanced by the simplification of the production of the flat elastomer bodies compared to the curved elastomer bodies.

The central supporting body is advantageously connected with the gearbox and the frame with the main frame, or the central supporting body is connected with the main frame and the frame with the gearbox. The initially named embodiment, in which the supporting body is connected with the gearbox and the frame with the main frame, is particularly preferred.

In a support designed as a fixed bearing, respectively at least two flat elastomer bodies on different sides of the central supporting body are preferably oriented in different directions obliquely to the rotor shaft axis and are arranged with respect to each other such that the supporting body is wedged between the flat elastomer bodies in the direction of a rotor thrust load parallel to the rotor shaft axis. In the case of flat elastomer bodies, which have only been used as floating bearings up to now, this absorption of the rotor thrust leads to thrust and/or shear loading in the rubber. Rubber reacts to thrust with great deformations so that the flat elastomers deflect strongly. Flat elastomers in floating bearings are used in this manner. In the case of the wedging of the central supporting body according to the invention, the rotor thrust loads are henceforth partially transferred into compressive loads in the rubber. Rubber reacts to pressure with a hard spring behavior so that the wedging greatly favors the use of the flat elastomer bodies as a fixed bearing.

Within the framework of the invention, rotor thrust is the axial force resulting from the wind pressure on the rotor in the direction of the rotational axis of the rotor. Depending on the operating state, in particular also in braking maneuvers, a reversal of the thrust direction (negative rotor thrust) can also result. In this case, the rotor pulls the tower forwards. For this reason, it is advantageous when the support designed as a fixed bearing can absorb the force in both directions. The wedging is thus preferably designed such that rotor thrusts in both directions are securely absorbed so that a fixed bearing is realized in both force directions.

The central supporting body is preferably a bolt. The bolt or the central supporting body preferably has a substantially polygonal cross-section in order to provide contact surfaces for the flat elastomer bodies.

The central supporting body preferably has a cross-section that is variable in the direction of the rotor shaft, in particular variable in height, for adjusting the wedging. The variable cross-section results from the obliquely set support surfaces of the supporting body for the flat elastomer bodies. Since the torque loads of the gearbox must be absorbed by the support, the flat elastomer bodies are preferably arranged above and below the central supporting body, since lateral, i.e. horizontal loads, perpendicular to the rotor shaft axis are less large than those that lead in the vertical direction provided that the support is arranged laterally on the gearbox. The variable height is thus the preferred variant since the bearing serves as a support. In the case of a support arranged for example below the gearbox, a different geometry should be selected, if applicable, so that for example a substantially symmetrical cross-section or wide cross-section with laterally arranged flat elastomer bodies is preferably selected here.

In the design process, the geometry of the central supporting body is selected in particular through adjustment of the height such that the material usage for the horizontal and vertical loads is the same.

One or more flat elastomer bodies are advantageously designed as polygonal flat elastomer bodies with more than three, in particular rounded, corners, as elliptical flat elastomer bodies or as circular flat elastomer bodies. In this case, circular flat elastomer bodies are particularly preferred since they are subject to particularly little wear since the round shape involves in any case an even distribution of force. It is advantageous to round the corners in polygonal, for example square or rectangular flat elastomer bodies in order to avoid force peaks on the corners, which lead to particularly fast material fatigue.

The height of the central supporting body is preferably greater than the width of the supporting body. This is in particular the case in a laterally attached support, in which the greatest load occurs in the vertical, brought about on one hand by the pitching moment of the rotor introduced via the leverage of the rolling-element bearing and the rotor shaft and on the other hand by the forces acting in the vertical direction from the torque during the operation of the wind turbine.

The flat elastomer bodies are preferably arranged at angles of more than 45° or of less than 45° to a horizontal or a vertical line, in particular depending on the loads acting on them during the operation of the wind turbine, in particular rotor thrust, torque, yaw moment and/or pitching moment. This deviation of the tilt angle from 45° is to be determined depending on the occurring forces. In the case of laterally arranged supports, flatter arrangements are advantageous, in which the flat elastomer bodies are arranged for example at angles with respect to a horizontal plane of between 15° and 40°, preferably 25° to 35°.

The central supporting body is advantageously arranged parallel or perpendicular to the rotor shaft axis, in the case of a perpendicular arrangement to the rotor shaft axis, in particular substantially horizontally. Two options for the orientation of the central supporting body are thus specified. One option is the orientation known from the floating bearings with hollow and cylindrical elastomer bodies parallel to the rotor shaft axis. This is space-saving in particular in the width since the actual bearing with the elastomer bodies can be arranged very close to the gearbox. The alternative is the orientation of the central supporting body perpendicular to the rotor shaft axis, in particular in a horizontal direction. This embodiment requires little space in a direction parallel to the rotor shaft axis.

The gearbox supporting means according to the invention is preferably further developed in that the frame has an upper frame part and a lower frame part, which are or can be interconnected by means of studs, wherein the studs are or can be stuck through continuous openings in the upper frame part and can be connected with the lower frame part or the main frame or the gearbox, wherein the studs are provided with screw nuts above the upper frame part, wherein the lower frame part is or can be permanently connected with the main frame. In particular, the studs are or can be additionally stuck through continuous openings in the lower frame part and provided with screw nuts between the upper frame part and the lower frame part. In this case, the studs can serve to screw the entire frame with the main frame. The lower frame part can also be welded for example with the main frame. Such a design with two frame parts, the central supporting body arranged in between and the flat elastomer bodies arranged in between is particularly well suited for assembly, disassembly and maintenance. The upper and lower frame parts can also be called the "Oberbock" and the "Unterbock" in German.

In particular, a disassembly holding body is preferably included in the latter case, which can be connected on one side with a part of the support connected with the gearbox and on the other side with a part of the support connected with the main frame or the main frame itself. In particular, the disassembly body can be connected with the supporting body on one side and the lower frame part or the main frame on the other side if the supporting body is connected with the gearbox. This disassembly holding body can hold the central supporting body and thus the support in a stationary position when the frame is screwed on in order to replace or to inspect the flat elastomer bodies. If the central supporting body or the frame is not held tight, the gearbox could be torn upwards over the rolling-element bearing under the weight of the rotor and the wind turbine could be damaged.

Further, the object underlying the invention is also solved through a wind turbine with a previously described gearbox supporting means according to the invention.

Finally, the object underlying the invention is also solved through a method for maintaining a previously described gearbox supporting means of a wind turbine according to the invention, in which
a) for maintaining flat elastomer bodies arranged between the bolt and the upper frame part
first the disassembly holding body is connected on one side with a part of a support connected with the gearbox and on the other side with a part of the support connected with the main frame or with the main frame,
then the screw nuts on the studs are loosened above the upper frame part and/or
b) for maintaining flat elastomer bodies arranged between the central supporting body and the lower frame part
first the screw nuts on the studs are loosened above the upper frame part and
then the gearbox with the central supporting body is lifted by the rotor weight or by an auxiliary means.

This method also makes it possible to remove, inspect and replace, if necessary, the flat elastomer bodies arranged on all sides of the central supporting body without needing to otherwise secure the gearbox. For example, electrical or hydraulic lifting devices are used as auxiliary means when the rotor weight is insufficient.

If both the upper and the lower flat elastomer bodies need to be maintained, it is preferably provided that
if the steps a) and b) are performed in succession, after execution of the sub-steps of step a) and before execution of the sub-steps of step b), the frame is tensioned again and the disassembly holding body is removed,
or
if the steps b) and a) are performed in succession, after execution of the sub-steps of step b) and before execution of the sub-steps of step a), the frame is tensioned again.

In this manner, a secure and efficient maintenance procedure is possible.

The advantages, characteristics and properties named for the individual invention objects, i.e. the gearbox supporting means, the wind turbine and the method, also apply without restriction to the respective other invention objects, which relate to each other.

Further characteristics of the invention will become apparent from the description of embodiments according to the invention together with the claims and the included drawings. Embodiments according to the invention can fulfil individual characteristics or a combination of several characteristics.

BRIEF DESCRIPTION OF THE DRAWINGS

The invention is described below, without restricting the general idea of the invention, using exemplary embodiments with reference to the drawings, whereby we expressly refer to the drawings with regard to all details according to the invention that are not explained in greater detail in the text. They show.

In the drawings, the same or similar elements and/or parts are provided with the same reference numbers in order to prevent the item from needing to be reintroduced.

DETAILED DESCRIPTION OF THE INVENTION

Figure 1:
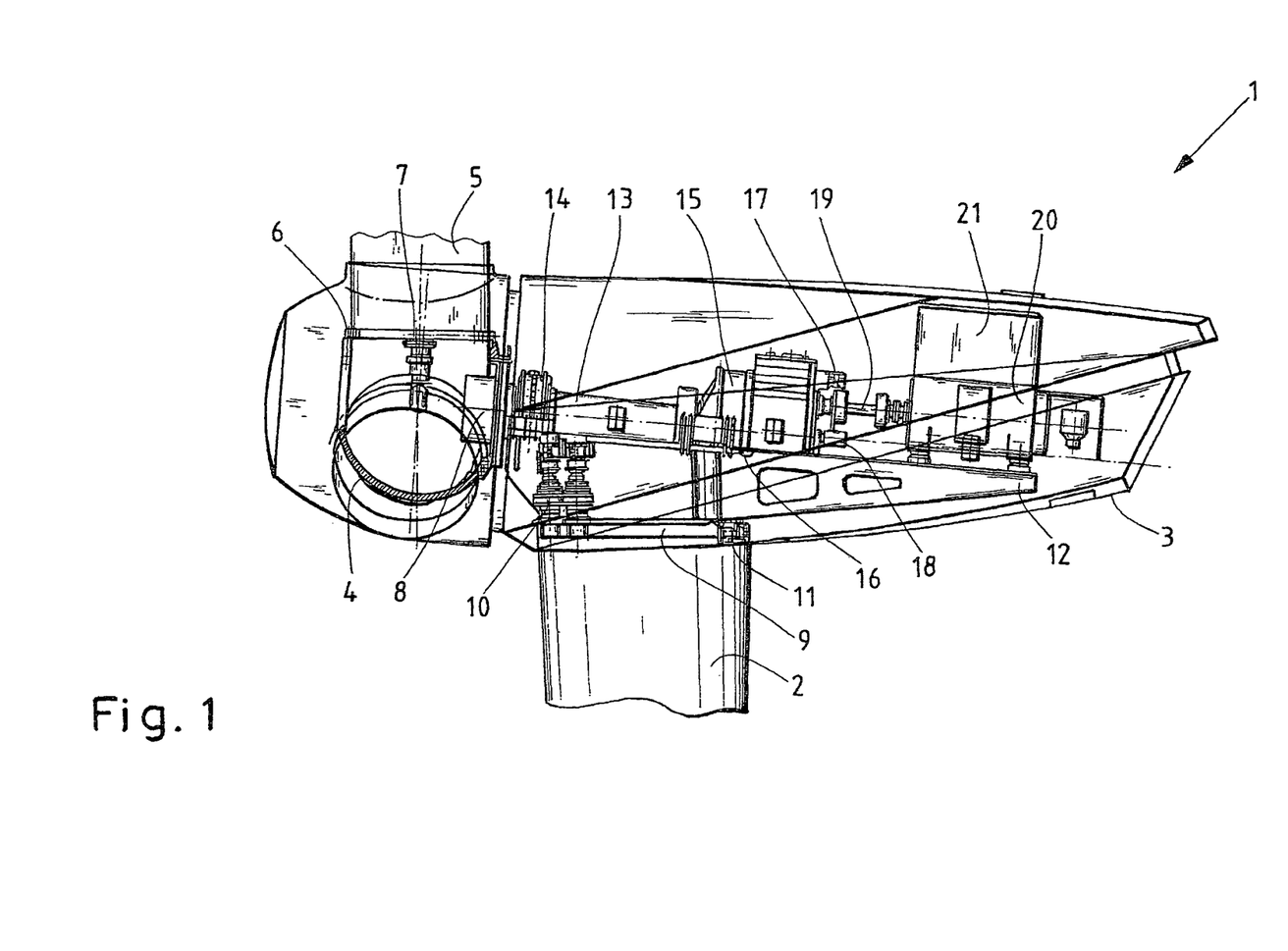
FIG. 1 is an elevational cross-section view through the nacelle of a known wind turbine.

FIG. 1 shows a cross-sectional representation through a nacelle of a known wind turbine, for example the MD70 wind turbine of the applicant. The nacelle 3 sits on a tower 2, of which the section close to the nacelle 3 is shown. The left side of FIG. 1 shows a rotor with a rotor hub 4, rotor blades 5, which are shown in the area of the rotor blade root only. The rotor blades 5 each have in the area of the rotor blade root a rotor blade bearing 6, on which a blade adjustment drive 7 engages. The blade adjustment drive 7 is driven by a controller 8 and changes the blade pitch angle of the respective rotor blade 5 during the operation of the wind turbine 1.

The nacelle 3 houses a main frame 12, which is connected with the tower 2 via a tower head rotating assembly 9. Yaw drive motors 10 of an azimuth adjustment engage with the tower head rotating assembly 9, which orient the nacelle or respectively the rotor towards the direction of the prevailing wind. There are four yaw drive motors 10 for this, two of which are arranged on the shown side and two are hidden behind it on the other side of the main frame 12. Azimuth brakes 11 also engage with the tower head rotating assembly 9, which serve to lock the azimuth adjustment of the rotor.

The rotor drives a rotor shaft 13, which is rotatably mounted in a rotor bearing 14 designed as a rolling bearing. In the case of the MD70 wind turbine of the applicant, the rotor bearing 14 is designed as a fixed bearing, which only permits a few millimeters of play in the axial direction of the rotor shaft 13. The rotor shaft 13 drives a gearbox 15, which converts the slow rotational movement of the rotor shaft into a fast rotational movement of a generator shaft 19, which is shown with couplings, which in turn drives a generator 20 for power generation, which is equipped with a heat exchanger 21.

The gearbox 15 also has a rotor brake 17 and a slip ring transmitter 18 as well as two elastic gearbox suspensions or respectively supports 16, one of which is shown in FIG. 1, while the other is located symmetrically on the other side of the gearbox 15 and is thus hidden by the gearbox 15.

The support 16 or respectively the elastic gearbox suspension is designed conventionally and consists of hollow and cylindrical elastomer bodies made of two semi-cylindrical partial bodies, which are arranged around a cylindrical bolt. With its cylindrical bearings, the cylindrical axis of which is oriented parallel to the rotor shaft 13, the support 16 is a floating bearing since it only absorbs little rotor thrust force in the direction of the rotor shaft axis due to its softness in this direction.

Figure 2:
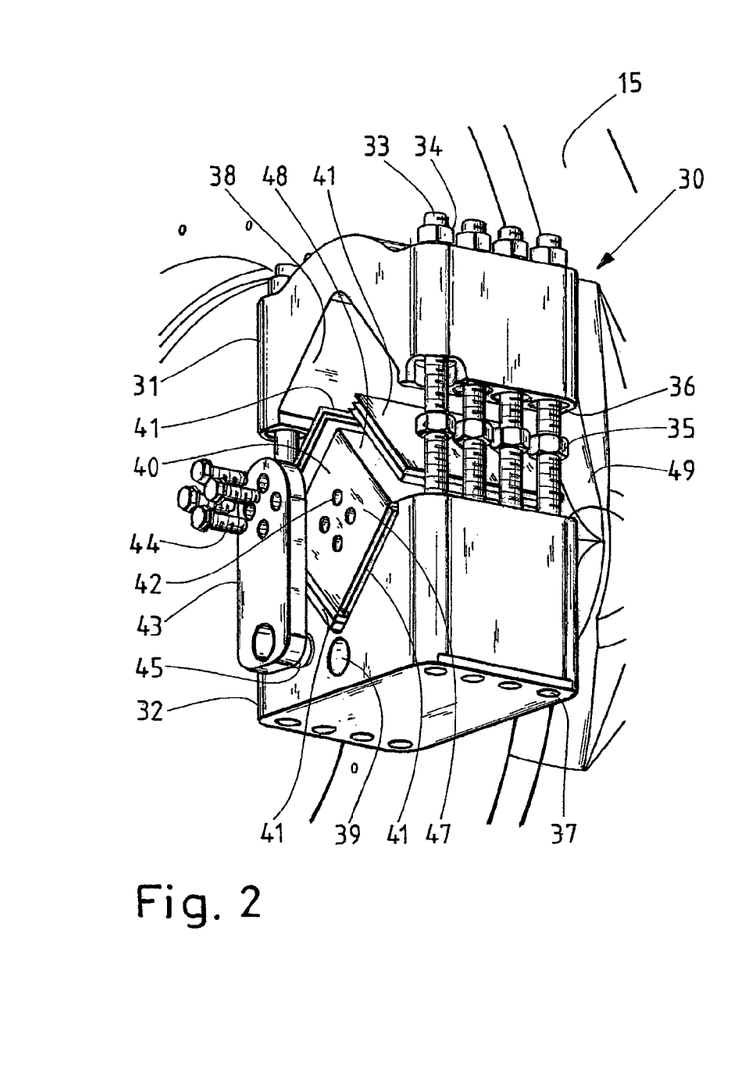
FIG. 2 is a perspective view of a support according to the invention with flat elastomer bodies.

FIG. 2 shows a first embodiment according to the invention of a support designed as a floating bearing shown with flat elastomer bodies. The substantially cylindrical housing part of the gearbox 15 is shown in sections in the background of FIG. 2. It is connected with a central supporting body 40 of the shown support via a bearing arm 49, the longitudinal axis of which is oriented parallel to the rotor shaft. In cross-section, the supporting body 40 is square and has four support surfaces 48 in 45° arrangement, on which rectangular flat elastomer bodies 41 rest. Around the supporting body 40 and the flat elastomer bodies 41, a frame 30 with an upper frame part 31 and a lower frame part 32 or respectively upper stand and lower stand are arranged, between which the supporting body 40 and the flat elastomer bodies 41 are clamped. The upper frame part 31 and the lower frame part 32 have corresponding complementary support surfaces 38 for the flat elastomer bodies 41.

For clamping the central supporting body 40 and the flat elastomer bodies 41, the frame parts 31, 32 have through openings 36, 37, through which studs 33 are stuck, which are connected with the main frame (not shown) on the lower end. Screw nuts 35, which are received in the installed state by a recess in the upper and/or lower frame part, serve to tension the lower frame part 32 with the main frame. Additional upper screw nuts 34 serve to tension the upper frame part 31 with respect to the lower frame part 32. Through the upper screw nuts 34, the supporting body 40 is thus clamped with the flat elastomer body 41.

The central supporting body 40 has four connection openings 42 on its front surface 47. Furthermore, the lower frame part 32 has a connection opening 39 centrally or respectively centered on its front surface. These connection openings 39 and 42 serve to mount a disassembly holding body 43, which is fastened on its upper end with four screws 44 on the supporting body 40 and enters the connection opening 39 on its lower end with a connection body 45 and thus prevents the supporting body 40 from being able to move with respect to the lower frame part 32. It is thus possible to raise the upper frame part 32 after loosening the upper screws 34 and to get to the upper flat elastomer bodies 41.

On the other hand, if it is provided that the lower flat elastomer bodies 41 below the supporting body 40 need to be maintained, then it is not necessary to use the disassembly holding body 43, but rather the upper screw nuts 34 are just loosened or respectively screwed upwards. Under the weight of the rotor, the gearbox is raised and thereby takes along the supporting body 40 and the upper frame part 31 upwards. If the own weight of the rotor is insufficient, the gearbox is raised if necessary with an auxiliary means, for example hydraulically.

Figure 3:
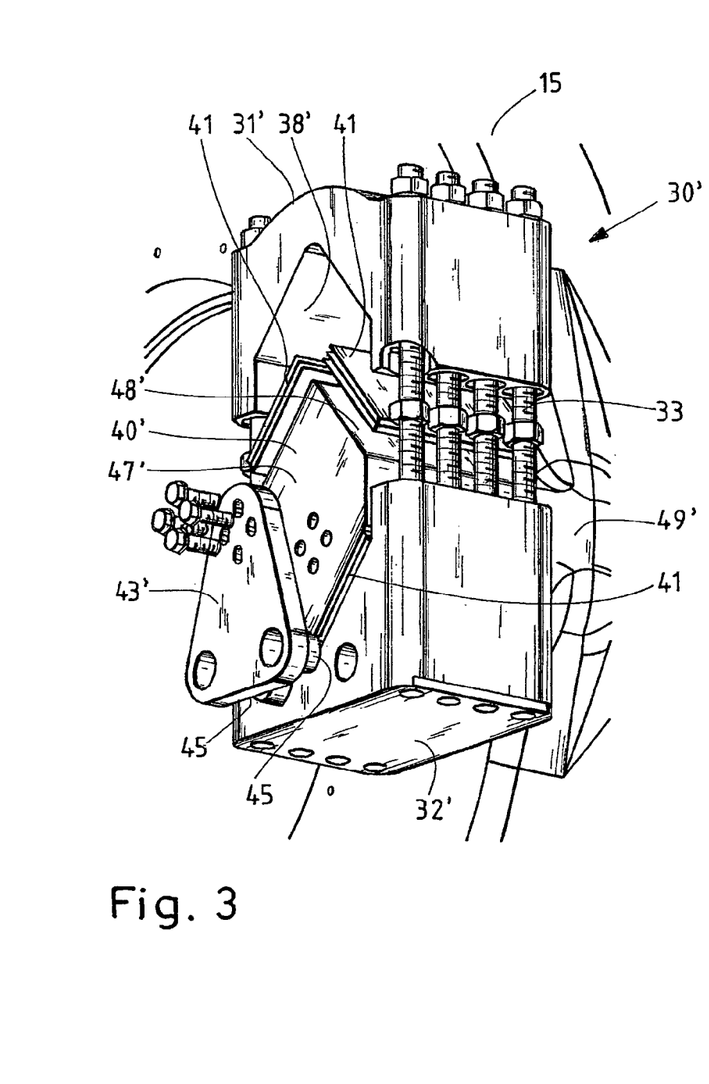
FIG. 3 is a perspective view of another floating bearing according to the invention with flat elastomer bodies.

FIG. 3 shows another example of an embodiment of a support designed as a floating bearing with flat elastomer bodies 41, which differs from the example shown in FIG. 2 by the geometry of the central supporting body 40'. The tilt angles of the support surfaces 48' are the same as the tilt angles of the support surfaces 48 in FIG. 2. The cross-section of the supporting body 40' is however higher so that the supporting body 40' also has two lateral surfaces. Due to the larger height of the supporting body 40', it can absorb higher vertical loads, resulting for example from the rotor torque. According to the invention, it is provided that the cross-sectional height for the dimensioning is selected such that it is optimally adjusted for the ratio of vertical force to horizontal force. The shape of the bearing arm 49' is also adjusted to the shape of the supporting body 40', also for the shape of the front surface 47' of the supporting body 40'. Moreover, the disassembly holding body 43' is henceforth designed triangularly with two connection bodies 45. The number of connection openings 39 and connection bodies 45 is also selected according to the occurring loads.

The upper frame part 31' and the lower frame part 32' of the frame 30' are also respectively elongated laterally in order to accommodate the taller size of the supporting body 40'. This central supporting body 40' has a higher load-bearing capacity compared to the central supporting body 40 from FIG. 2 due to its increased cross-section, in particular in the vertical direction.

Figure 4:
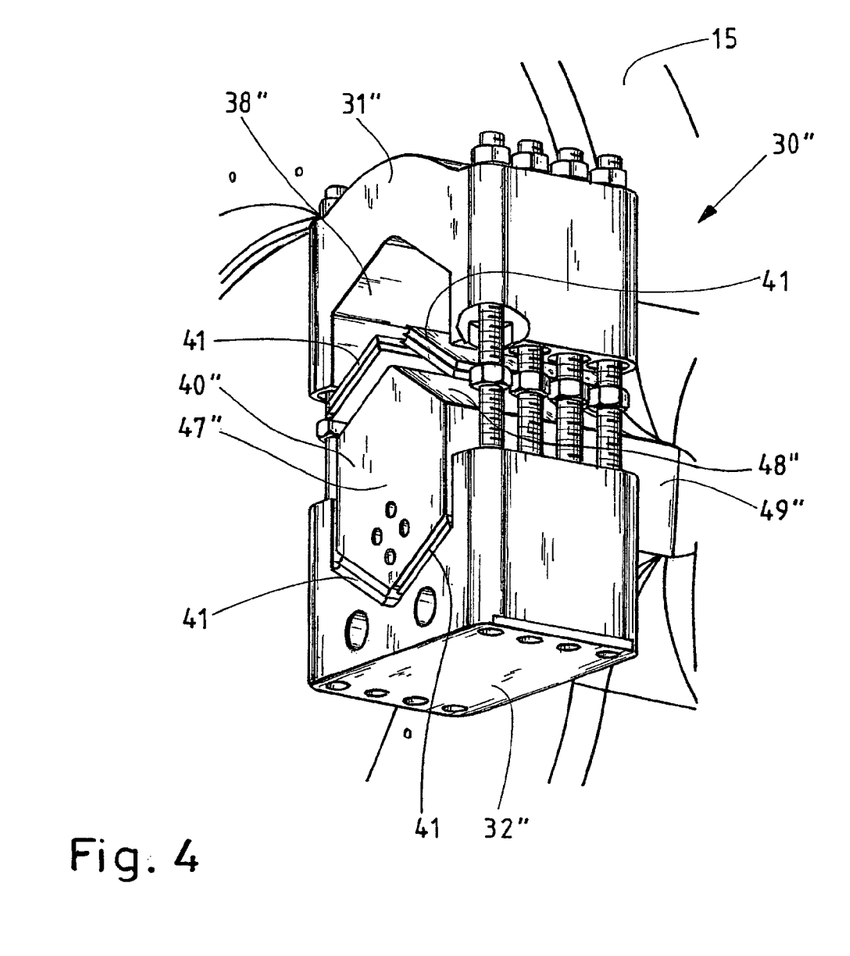
FIG. 4 is a perspective view of another embodiment according to the invention of a floating bearing with flat elastomer bodies.

FIG. 4 shows schematically another example of an embodiment according to the invention of a support designed as a floating bearing, in which the corresponding elements are labeled with reference numbers 32", 40" etc. in order to clarify the differences compared to the example embodiments in FIG. 2 and FIG. 3. In the support shown in FIG. 4, the cross-section of the central supporting body 40" is hexagonal, wherein the tilt of the support surfaces 38" and the flat elastomer bodies 41 to the horizontal plane is 30°. As can be seen on the front surface, this shape also requires a triangular disassembly holding body 43. This shape of the frame 30" and of the supporting body 40" is also designed in the vertical direction for high loads, wherein in particular the flat elastomer bodies 41 arranged in a flatter manner are suitable for absorbing the higher vertical load and the lower horizontal load.

Figure 5:
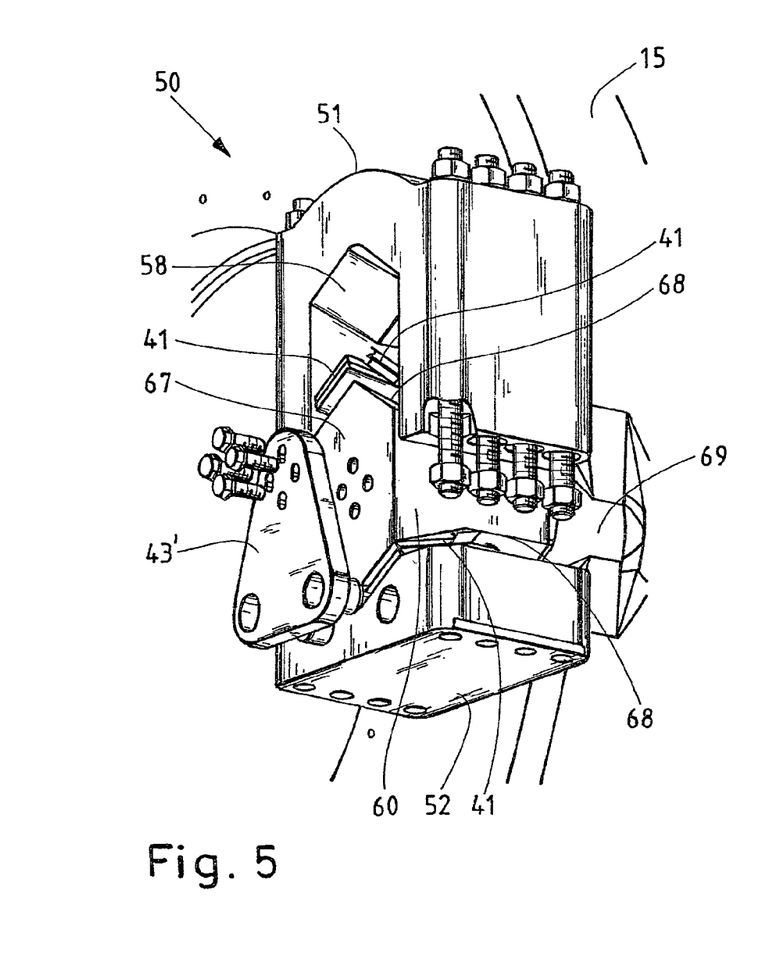
FIG. 5 is a perspective view of a support according to the invention.

FIG. 5 shows another exemplary embodiment of a support according to the invention in a schematic and perspective manner. The reference numbers for the similar details are increased by 20 compared to FIGS. 2 to 4. Compared to the supports in FIGS. 2 to 4 designed as floating bearings, the support shown in FIG. 5 is designed so that the central supporting body 60 has a cross-section that is variable along its length. Looking at the front surface 67 of the supporting body 60, the flat elastomer bodies 41 have a tilt of approximately 30° to the horizontal. The central supporting body 60 also has two perpendicular lateral surfaces. However, FIG. 5 shows that the vertical cross-section of the supporting body 60 decreases parallel to the rotor shaft axis in the direction towards the center of the supporting body 60. This means that the support surfaces 68 of the supporting body 60 as well as the flat elastomer bodies 41 are also arranged sloped in this direction, namely with a tilt of approximately 20°. The upper and lower flat elastomer bodies 41 are thus arranged effectively in a doubled wedge shape with respect to each other.

Progressively after passing the center of the supporting body 60, the other flat elastomer bodies are arranged mirror-symmetrically with respect to the visible flat elastomer bodies so that another, reversed wedge shape results. This doubled wedge shape absorbs rotor thrust loads in both directions towards the rotor shaft as well as the gearbox. The support surfaces 58 in the upper frame part 51 and in the lower frame part 52 are designed in a correspondingly complementary manner. The bearing arm 69, which connects the central supporting body 60 with the gearbox 50, is designed correspondingly in cross-section. This is an example of a flying bearing.

Figure 6:
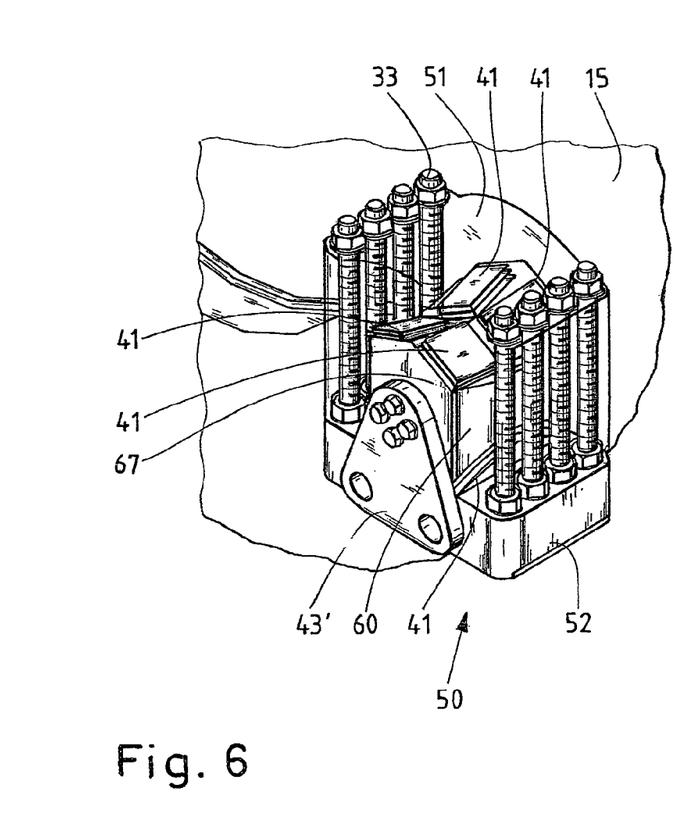
FIG. 6 is a perspective view of a support according to the invention.

FIG. 6 shows schematically the support of FIG. 5 in another perspective representation. The upper frame part 51 is thereby shown in a transparent manner so that the geometry of the four upper flat elastomer bodies is clearly visible. They are arranged in a substantially saddle-shaped manner with respect to each other. The same also goes for the not completely visible lower flat elastomer bodies 41. The flat elastomer bodies 41 shown perspectively on the front surface 67 absorb those axial forces that are oriented away from the observer, while the flat elastomer bodies 41 arranged behind it absorb the axial forces acting towards the observer.

Figure 7:
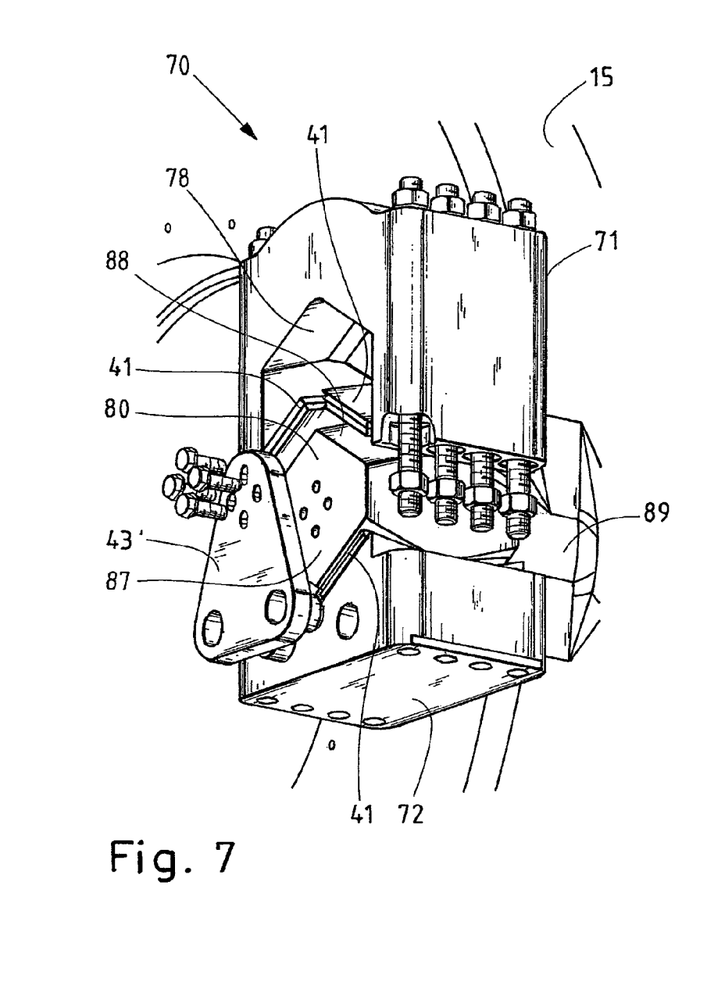
FIG. 7 is a perspective view of another support according to the invention.
Figure 8:
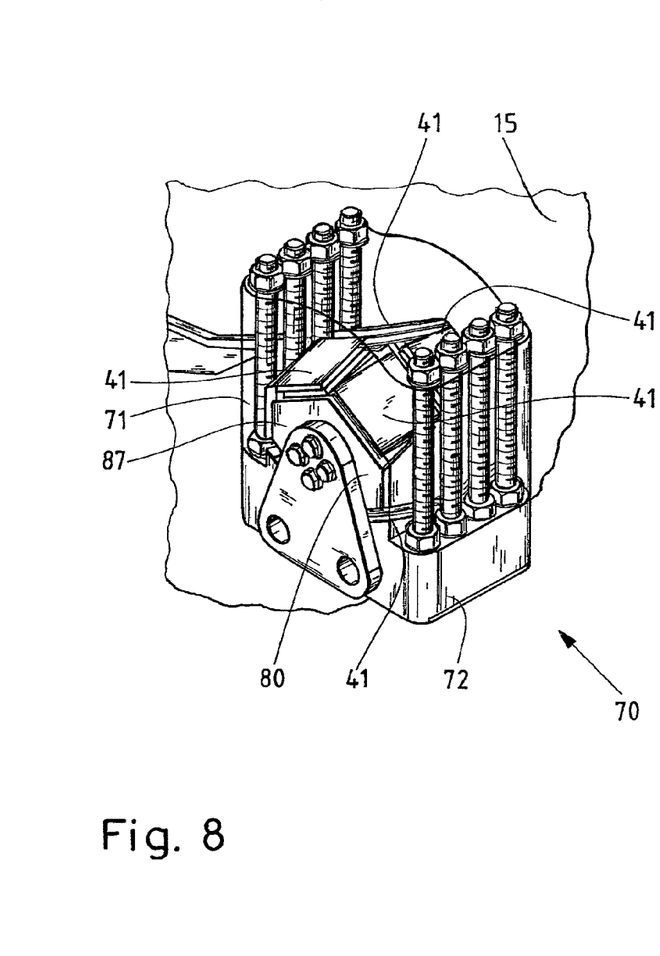
FIG. 8 is a perspective view of the support according to FIG. 7.

FIGS. 7 and 8 show another example of a support of a gearbox supporting means according to the invention in which the reference numbers are increased by an additional 20 compared to the example in FIGS. 5 and 6. In this case, the flat elastomer bodies 41 are not arranged in a saddle-shaped manner, but rather such that their normal vectors point towards each other. In both cases, i.e. in FIG. 7 and FIG. 8, the observer is looking at the front surface 87 with the corresponding openings for a disassembly holding body 43', wherein the flat elastomer bodies 41 oriented towards the observer absorb axial forces in the direction towards the observer through the wedging of the central supporting body 80, and the flat elastomer bodies 41 facing away from the observer absorb the opposite rotor thrust forces. The normal vectors towards the flat elastomer bodies 41 or respectively the support surfaces 88 or respectively 78 have substantially an "X" shape in this case. This is in contrast to the exemplary embodiment in FIGS. 5 and 6, in which these surface normal vectors point away from each other and substantially have an "O"-shaped configuration.

Figure 9:
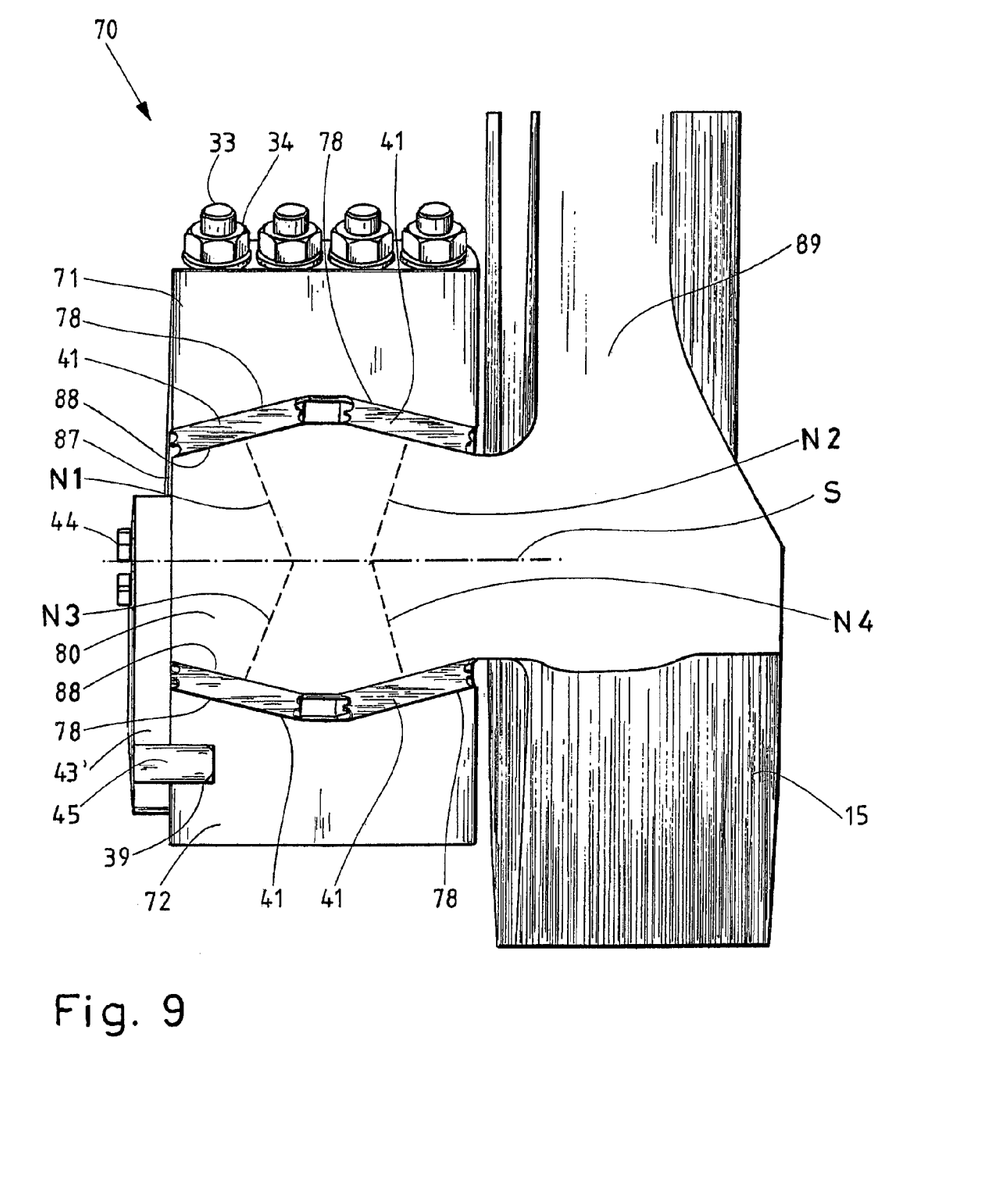
FIG. 9 is a schematic cross-sectional representation through a support according to the invention designed as a flying bearing.

FIG. 9 shows a cross-section through a support according to the invention according to FIG. 7 and FIG. 8. A bearing arm 89, which is connected with a housing of the gearbox 15, opens into a central supporting body 80 with several support surfaces 88, on each of which rests a flat elastomer body 41. This supporting body 80 is only mounted on one side so that it is a flying bearing. It is particularly space-saving and easy to maintain.

Figure 16:
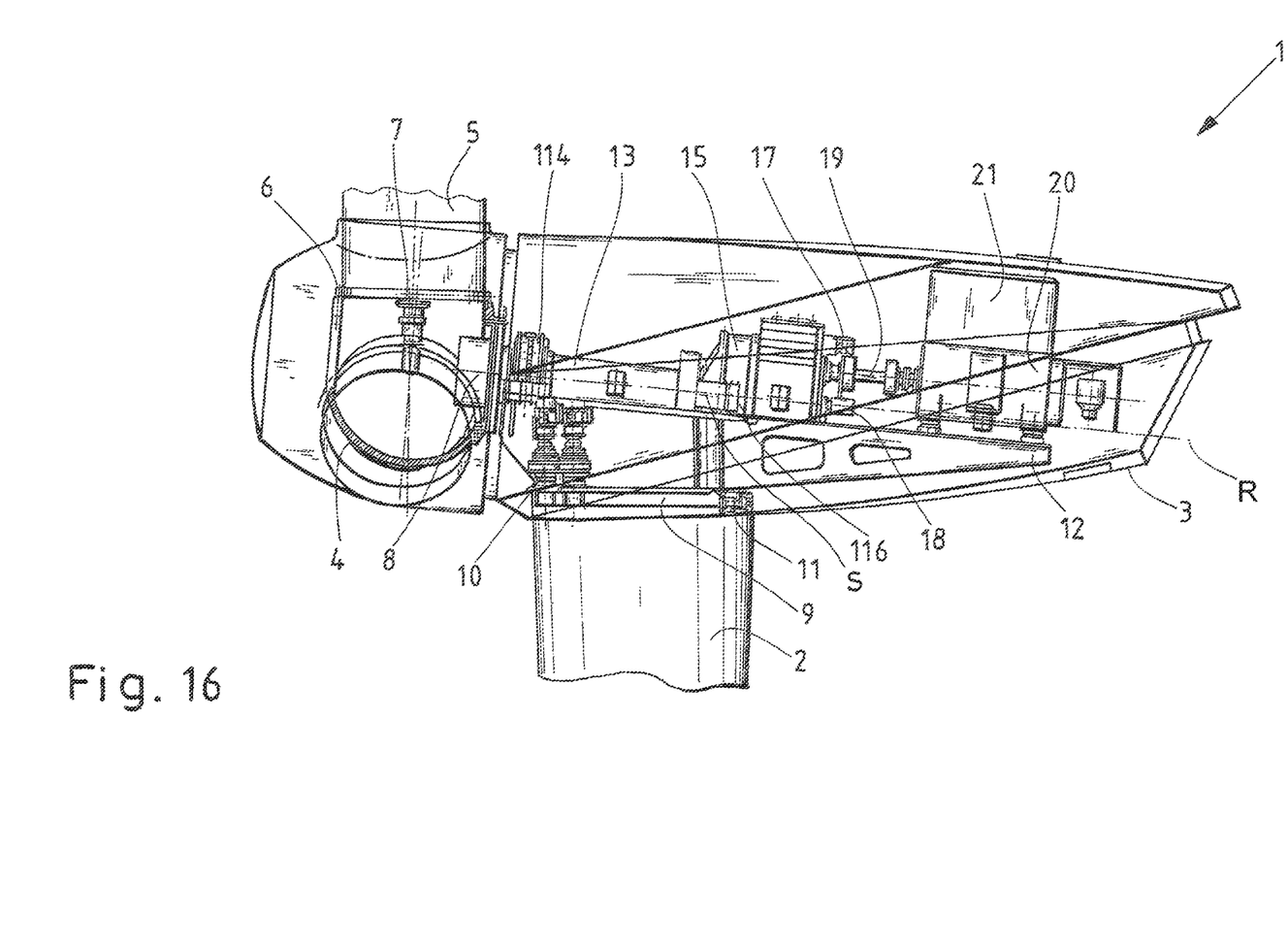
FIG. 16 is an elevational cross-section view through the nacelle.

The normal vectors N1 to N4 on the flat elastomer bodies 41 point towards each other and together result in a type of "X" configuration, in particular with respect to a symmetry axis S through the central supporting body 80. For reference, the symmetry axis S is also shown in FIG. 16. It is clear that the flat elastomer bodies 41 are composite flat bodies, which can be produced in a known manner through a layering of metallic plates and elastic material inserted in between, for example rubber or an artificial elastomer. In this preferred embodiment, it is possible through suitable selection of the flat elastomer layers and the number of intermediate plates to adjust the spring rigidity within a broad range, as is beneficial for the acting mass and load ratios.

The left side of FIG. 9 also shows a disassembly holding body 43' in an installed position, wherein a connection body 45 of the disassembly holding body 43 is inserted in a corresponding receiving opening 39 in the lower frame part 72, while the screws 44 connect the upper part of the disassembly holding body 43' with the supporting body 80. This arrangement has the advantage of easy accessibility and easy maintainability since the support can be arranged on a side that is easily accessible.

An alternative design of the disassembly body provides that the central supporting body 80 in FIG. 9 is elongated far enough to the left that a sufficiently large bore hole from top to bottom has room next to the frame 70. Through this bore hole, a disassembly holding body, e.g. in the form of a large screw or a stud, is then screwed and connected with the overall framework or a component connected with the lower frame part 72.

Figure 10:
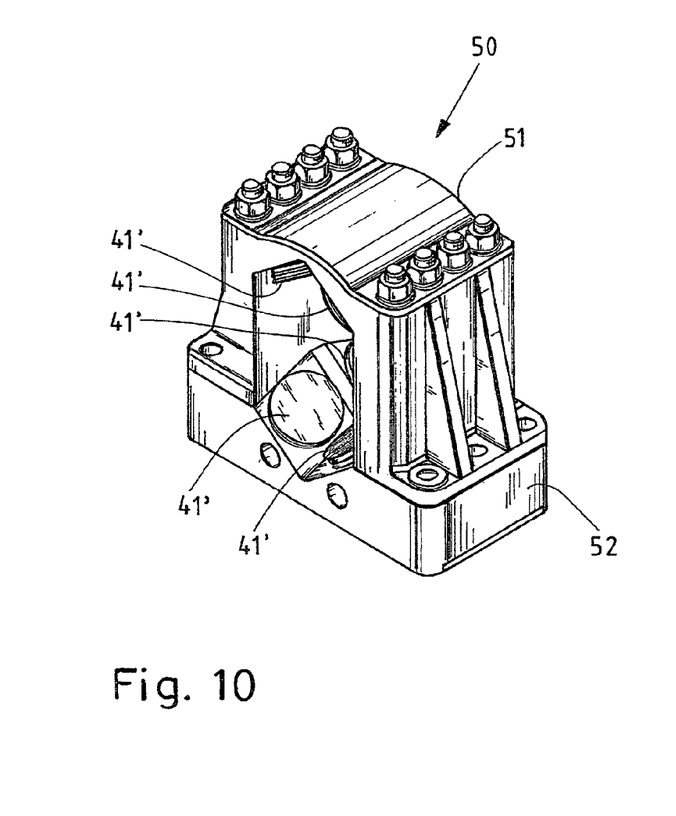
FIG. 10 is a perspective view of another support according to the invention.
Figure 11:
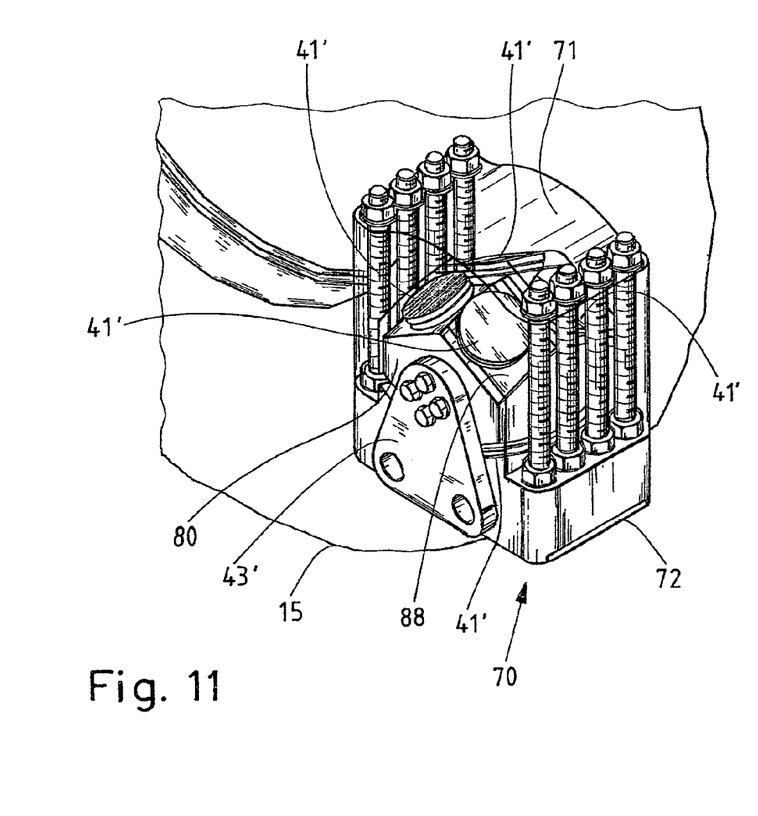
FIG. 11 is a perspective view of the support according to FIG. 9.

FIGS. 10 and 11 show two exemplary embodiments according to the invention, which are oriented towards the exemplary embodiments in FIGS. 5 to 9. The configuration of the central supporting body and of the frame in FIG. 10 thus corresponds with that of the frame 50 according to the invention from FIGS. 5 and 6. The configuration in FIG. 11 corresponds with that in FIGS. 7, 8 and 9. However, in contrast to the aforementioned figures, the flat elastomer bodies 41' are not designed in a rectangular manner, but are round. This leads to lower local loads of the flat elastomer bodies 41 and thus 41' and thus to an increased service life and reduced maintenance frequency.

Figure 12:
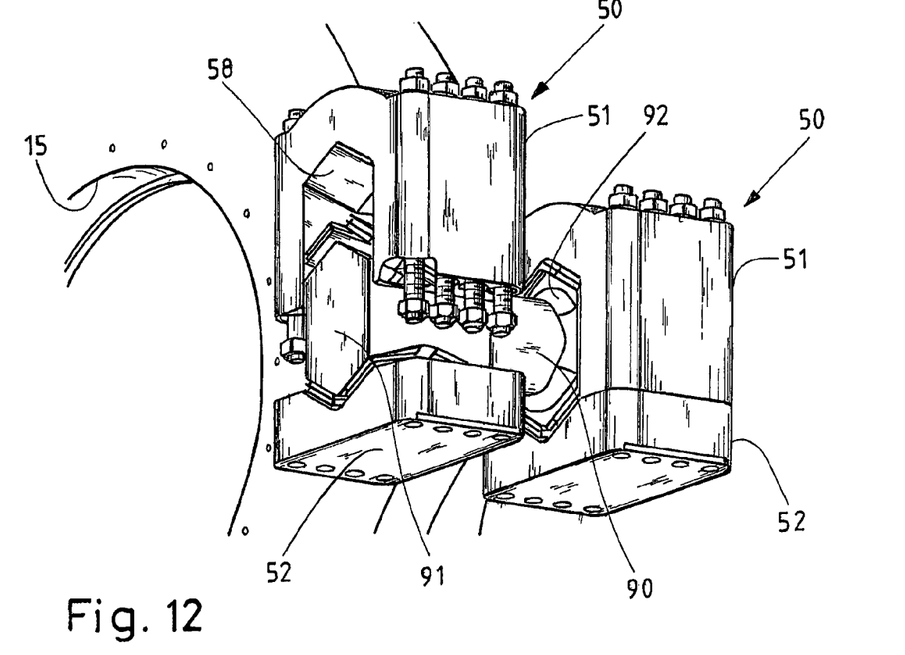
FIG. 12 is a perspective view of another support according to the invention.

FIG. 12 shows another exemplary embodiment of a support according to the invention, wherein a double flying bearing with a central double supporting body 90 with bolt heads 91, 92 is used. Each individual supporting body 91, 92 of the double supporting body 90 is in turn designed with an "O"- shaped normal vector configuration according to the exemplary embodiment in FIGS. 5, 6 and 10. The frames 50 also correspond with those in FIGS. 5, 6 and 10. However, they can be designed with reduced load specifications, if necessary, due to the doubled design. With respect to the maintenance of the flat elastomer bodies 41 clamped therein, the accommodation of a disassembly holding body 43, 43' is not necessary since the gearbox is respectively held by the frame that is currently not being maintained.

Figure 13:
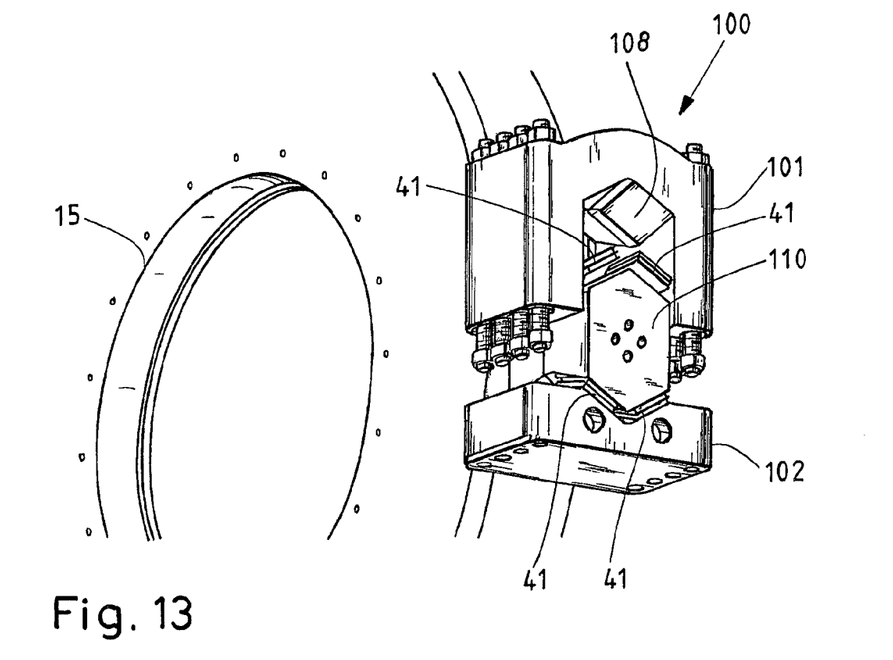
FIG. 13 is a perspective view of another support according to the invention.

FIG. 13 shows another exemplary embodiment of a flying bearing according to the invention, wherein however the central supporting body 110 is arranged obliquely to the rotor shaft axis. In relation to the rotor thrust in the direction of the rotor shaft axis, the flat elastomer bodies 41 are arranged in an "X" configuration with respect to their normal vectors. An "O" configuration prevails with respect to radial components in relation to the gearbox 15. The flat elastomer bodies 41 are arranged on the top side and on the bottom side in a substantially saddle-shaped manner. The frame parts 101, 102 of the frame 100 as well as the support surface 108 are modified for this configuration. This preferred embodiment represents a particularly compact and material-saving arrangement.

Figure 14:
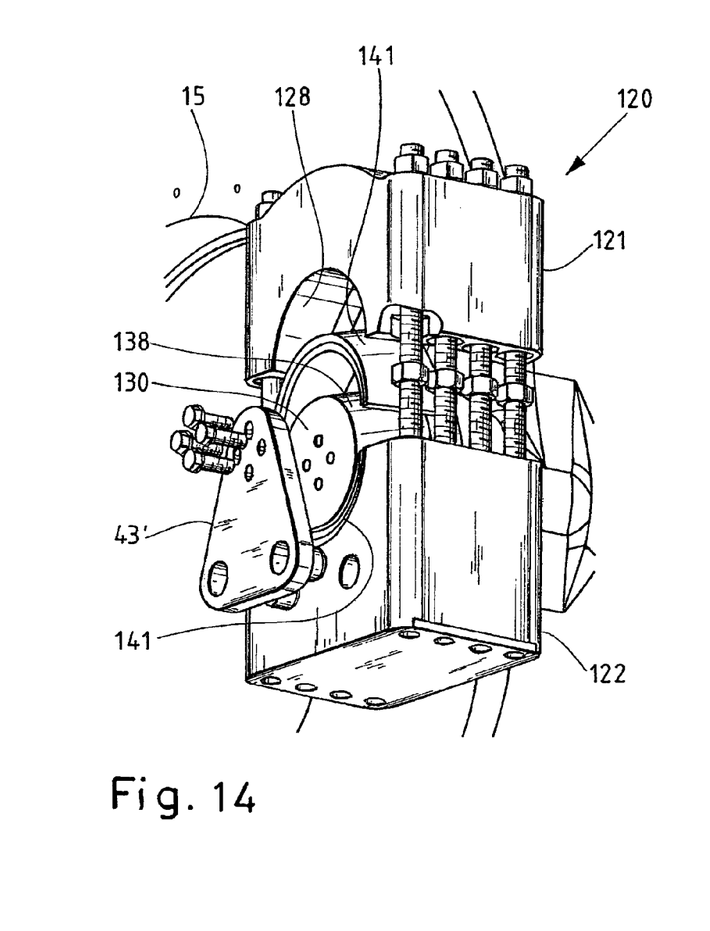
FIG. 14 is a perspective view of another support and FIG. 15 is a perspective view of the support according to FIG. 14.
Figure 15:
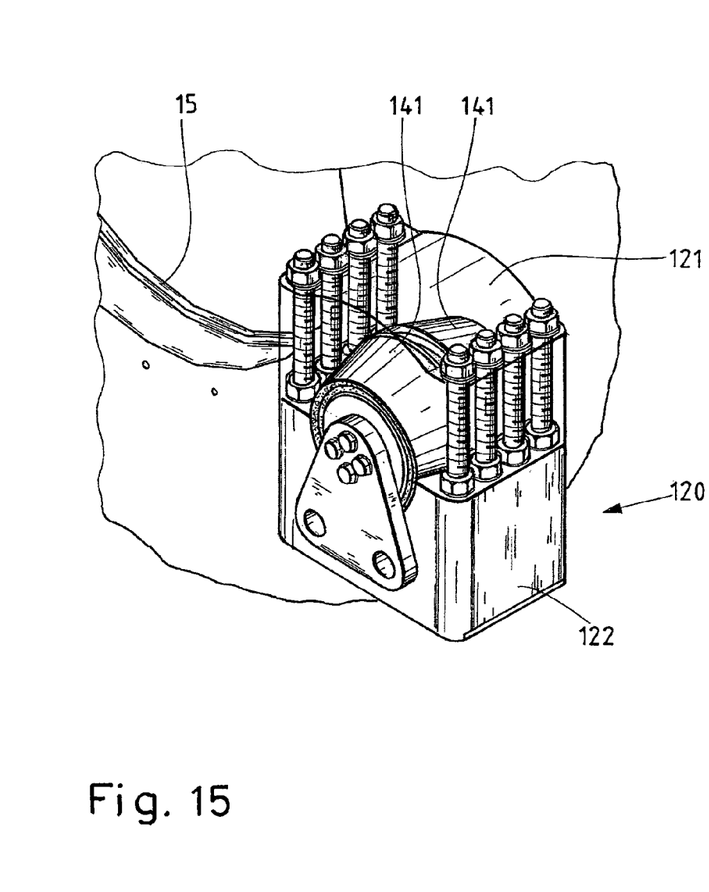

FIGS. 14 and 15 show schematic representations of another inventive support. The support shown in FIG. 14 and FIG. 15 comprises a central supporting body 130 as well as a bearing 120 with bearing parts 121, 122 between which two conical elastomer bodies 141 are clamped, wherein the common central symmetry axis of the cones is in turn parallel to the rotor shaft axis. The conical elastomer bodies 141 are oriented with respect to each other such that an "X" configuration results with respect to their surface normal vectors in cross-section and in elongation to the common central axis, comparable with the situation shown in FIG. 9. This also concerns a flying bearing, on the head end of which a disassembly holding body 43' can be used.

The conical elastomer bodies 141 are not the flat elastomer bodies 41, 41 provided in the present application according to the invention, which are designed substantially without a curvature in one plane. However, the versions shown in FIG. 14 and FIG. 15 have their own inventive rank. Due to the aforementioned "X" configuration, they permit easy access and replacement and are thus maintenance-friendly. They also offer the option of a flying bearing.

FIG. 16 is similar to FIG. 1. However, as is shown in FIG. 16, at least two of the supports are fixed bearings 116 for absorbing at least 50% of rotor thrust acting in an axial direction of the rotor shaft 16 during operation of the wind turbine 1. Further, at least two of the supports are floating bearings 114, and the flat elastomer bodies are oriented with their surface normal vectors perpendicular to a rotor axis R so that rotor thrust causes a shearing stress in the flat elastomer bodies.

Figure 17:
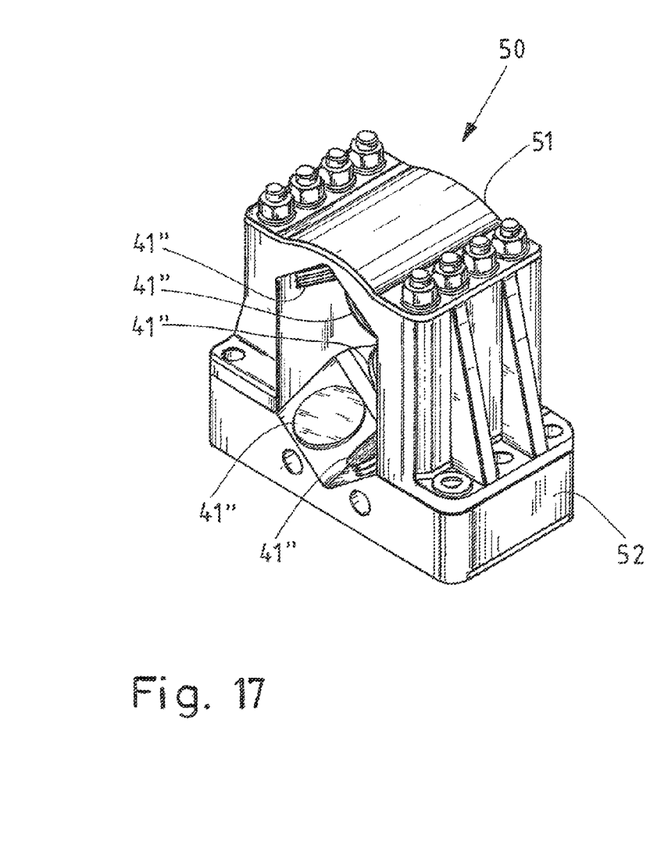
FIG. 17 is a perspective view of another support.

FIG. 17 is similar to FIG. 10, but also illustrates that one or more of the flat elastomer bodies 41" are elliptical shaped.

Figure 18:
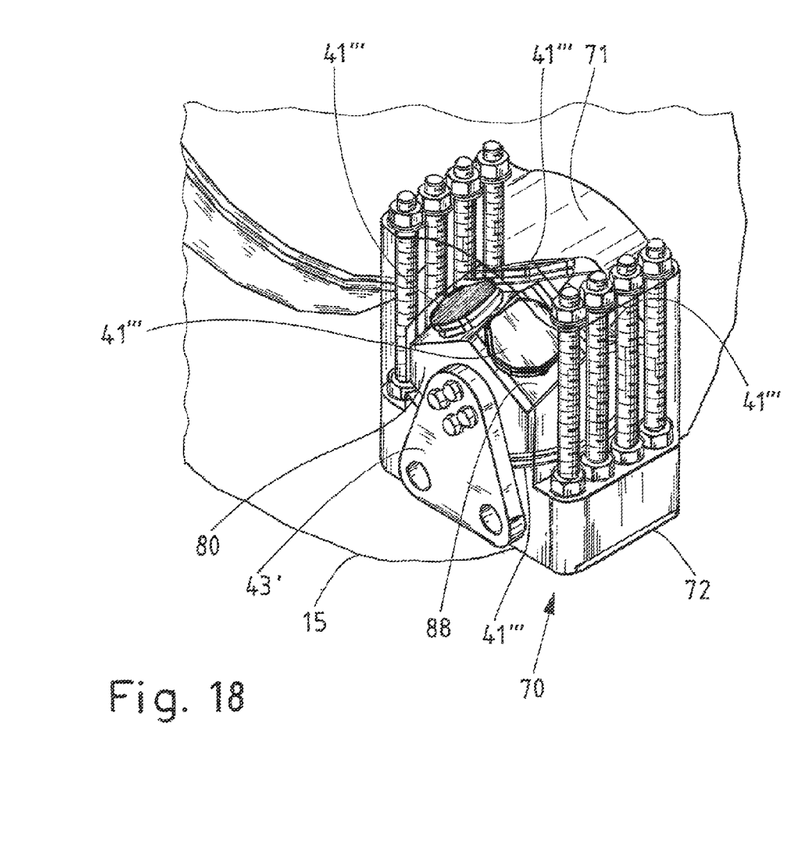
FIG. 18 is a perspective view of another support.

FIG. 18 is similar to FIG. 11, but also illustrates that one or more of the flat elastomer bodies 41'" have a polygonal shape with more than three rounded corners.

All named characteristics, including those taken from the drawings alone and individual characteristics, which are disclosed in combination with other characteristics, are considered alone and in combination as essential for the invention. Embodiments according to the invention can be realized by individual features, or a combination of several features.

LIST OF REFERENCE NUMBERS

1 Wind power plant
2 tower
3 Nacelle
4 rotor hub
5 rotor blade
6 Rotor blade bearing
7 Blade adjustment drive
8 Controller of the blade adjustment
9 Tower head rotating assembly
10 Yaw drive motors
11 Azimuth brakes
12 Main frame
13 Rotor shaft
14 Rotor bearing
15 Gearbox
16 Elastic gearbox suspension
17 Rotor brake
18 Slip ring transmitter
19 Generator shaft with couplings
20 Generator
21 Heat exchanger
30-30" Frame
31-31" Upper frame part
32-32" Lower frame part
33 Studs
34, 35 Screw nuts
36, 37 Through openings
38 Support surface
39 Connection opening
40-40" Central supporting body
41 Rat elastomer body
41' Round flat elastomer body
42 Connection openings
43, 43' Disassembly holding body
44 Screws
45 Connection body
47-47" Front surface
48-48" Support surface
49-49" Bearing arm
50 Frame
51 Upper frame part
52 Lower frame part
58 Support surface
60 Central supporting body
67 Front surface
68 Support surface
69 Bearing arm
70 Frame
71 Upper frame part
72 Lower frame part
78 Support surface
80 Central supporting body
87 Front surface
88 Support surface
89 Bearing arm
90 Double supporting body
91, 92 Supporting body
100 Frame
101 Upper frame part
102 Lower frame part
108 Support surface
110 Central supporting body
120 Frame
121 Upper frame part
122 Lower frame part
128 Support surface
130 Central supporting body
138 Support surface
141 Conical flat elastomer body
S Symmetry axis
N1-N4 Normal vectors

What is claimed is:

1. A gearbox supporting device of a wind turbine, the wind turbine including a rotor, a substantially horizontally oriented rotor shaft, a gearbox, and a main frame, said gearbox supporting device comprising:
   at least one rolling bearing arranged between a rotor hub and the gearbox and at least two supports on the gearbox, wherein the supports each have at least one central supporting body, at least one frame and a plurality of flat elastomer bodies that are clamped between the frame and the central supporting body, and wherein the central supporting body is only supported on one side.

2. A wind turbine with a gearbox supporting device according to claim 1.

3. The gearbox supporting device according to claim 1, wherein at least two of the supports are fixed bearings for absorbing at least 50% of rotor thrust acting in an axial direction of the rotor shaft during operation of the wind turbine.

4. The gearbox supporting device according to claim 1, wherein at least two of the supports are floating bearings, and wherein the flat elastomer bodies are oriented with their surface normal vectors perpendicular to a rotor axis so that rotor thrust causes a shearing stress in the flat elastomer bodies.

5. The gearbox supporting device according to claim 1, wherein the central supporting body is connected with the gearbox and the frame is connected with the main frame.

6. The gearbox supporting device according to claim 1, wherein at least one of the supports is a fixed bearing, and wherein at least two of the flat elastomer bodies are disposed in the supports on different sides of the central supporting body and oriented in different directions obliquely to a rotor shaft axis and are arranged with respect to each other such that the central supporting body is wedged between the flat elastomer bodies in a direction of a rotor thrust load parallel to the rotor shaft axis.

7. The gearbox supporting device according to claim 6, wherein the central supporting body has a cross-section that does not have a constant size in a direction of the rotor shaft, and wherein the cross-section of the central supporting body does not have a constant size in height for adjusting a wedging.

8. The gearbox supporting device according to claim 1, wherein one or more of the flat elastomer bodies have a polygonal shape with more than three rounded corners.

9. The gearbox supporting device according to claim 1, wherein a height of the central supporting body is greater than a width of the central supporting body.

10. The gearbox supporting device according to claim 1, wherein during at least one of rotor thrust, torque, yaw moment and pitching moment, the flat elastomer bodies are arranged at angles of more than 45° or of less than 45° to a horizontal line.

11. The gearbox supporting device according to claim 1, wherein the central supporting body is arranged parallel or perpendicular to a rotor shaft axis, and wherein when the central supporting body is arranged perpendicular to the rotor shaft axis, the central supporting body is substantially horizontal.

12. The gearbox supporting device according to claim 1, wherein the frame has an upper frame part and a lower frame part that are interconnected by studs, wherein the studs extend through continuous openings in the upper frame part and are connected with at least one of the lower frame part, the main frame, and the gearbox, and wherein the studs are provided with screw nuts above the upper frame part and the lower frame part is permanently connected with the main frame.

13. The gearbox supporting device according to claim 12, further comprising a disassembly holding body that is connected on a first side with a part of one of the at least two supports connected with the gearbox and connected on a second side with a part of the one of the at least two supports that is connected with the main frame or with the main frame itself.

14. A method for maintaining a gearbox supporting device of a wind turbine according to claim 13, comprising the steps of:
   a) maintaining the flat elastomer bodies arranged between the central supporting body and the upper frame part by first connecting the first side of the disassembly holding body with the part of the support connected with the gearbox and connecting the second side of the disassembly holding body with the part of the support connected with the main frame or with the main frame itself, and then loosening the screw nuts on the studs above the upper frame part; and
   b) maintaining the flat elastomer bodies arranged between the central supporting body and the lower frame part by first loosening the screw nuts on the studs above the upper frame part and then raising the gearbox with the central supporting body by at least one of a rotor weight or an auxiliary device.

15. The method according to claim 14, wherein if the steps a) and b) are performed in succession, after execution of the sub-steps of step a) and before execution of the sub-steps of step b), the frame is tensioned again and the disassembly holding body is removed, and wherein if the steps b) and a) are performed in succession, after execution of the sub-steps of step b) and before execution of the sub-steps of step a), the frame is tensioned again.

16. The gearbox supporting device according to claim 1, wherein at least two of the supports are fixed bearings for absorbing at least 80% of rotor thrust acting in an axial direction of the rotor shaft during operation of the wind turbine.

17. The gearbox supporting device according to claim 1, wherein the central supporting body is connected with the main frame and the frame is connected with the gearbox.

18. The gearbox supporting device according to claim 1, wherein one or more of the flat elastomer bodies are elliptical shaped.

19. The gearbox supporting device according to claim 1, wherein one or more of the flat elastomer bodies are circular shaped.

* * * * *